Jan. 1, 1929.

W. S. EDSALL

CIRCUIT INTERRUPTER

Filed July 22, 1922

Inventor
William S. Edsall

Patented Jan. 1, 1929.

1,697,309

UNITED STATES PATENT OFFICE.

WILLIAM S. EDSALL, OF READING, MASSACHUSETTS, ASSIGNOR, BY MESNE ASSIGNMENTS, TO CONDIT ELECTRICAL MANUFACTURING CORPORATION, OF BOSTON, MASSACHUSETTS, A CORPORATION OF MASSACHUSETTS.

CIRCUIT INTERRUPTER.

Application filed July 22, 1922. Serial No. 576,709.

This invention relates to electric switches and particularly to oil immersed electric switches of the type adapted to be contained in an enclosing compartment or cell.

Cell type electric switching apparatus commonly includes a main switch, which is usually of the oil immersed type and a disconnecting switch. The disconnecting switch serves, as its main purpose, to isolate the main switch from the circuit whereby to permit the safe inspection and removal of the main switch from the cell. The main switch is adapted to complete and interrupt the circuit. The disconnecting switch is adapted to carry the current but not to interrupt the circuit and is adapted to be opened only after the main switch has opened, and close before the main switch has closed. The disconnecting switch is usually of the air-break type.

The disconnecting switch may carry relatively high values of current and thereby operate at a relatively high temperature. Due to the exposure of the contact members of the disconnecting switch to the atmosphere, as is the usual practice, the contact surfaces become oxidized and dirty, and the electrical resistance at the contact junction consequently becomes higher, which results in an aggravated increase in temperature and heating, and reduced current carrying capacity.

An object of this invention is to provide a disconnecting switch with means to protect the contact surfaces thereof from oxidation due to exposure to the atmosphere and, specifically, to cover the contact surfaces with or immerse them in a suitable protective medium, as oil, for instance, by which the surfaces are protected from oxidation.

A further object is the provision of electric switching apparatus comprising the combination of a main switch and a disconnecting switch carried preferably by the main switch, the disconnecting switch characterized by having its movable contact members immersed in oil, and means to operate the switches in proper sequence.

A further object is generally to improve the construction and operation of electric switches.

Certain features of this invention are disclosed in an application of Sears B. Condit, Serial No. 576,737, filed July 22, 1922, now Patent 1,650,190, November 27, 1927.

Figure 1:
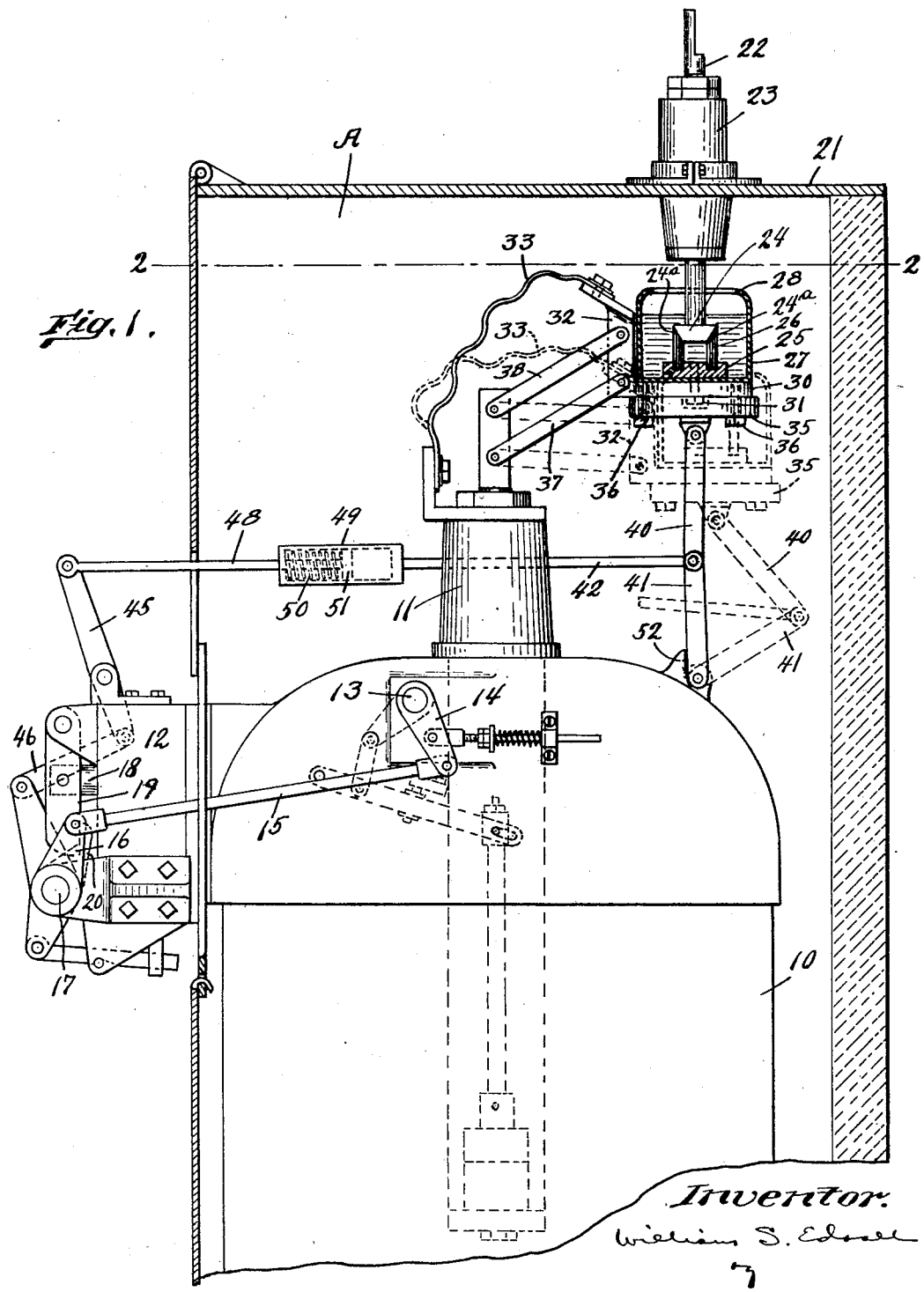
Fig. 1 is a partial view in side elevation, of switching apparatus.
Figure 2:
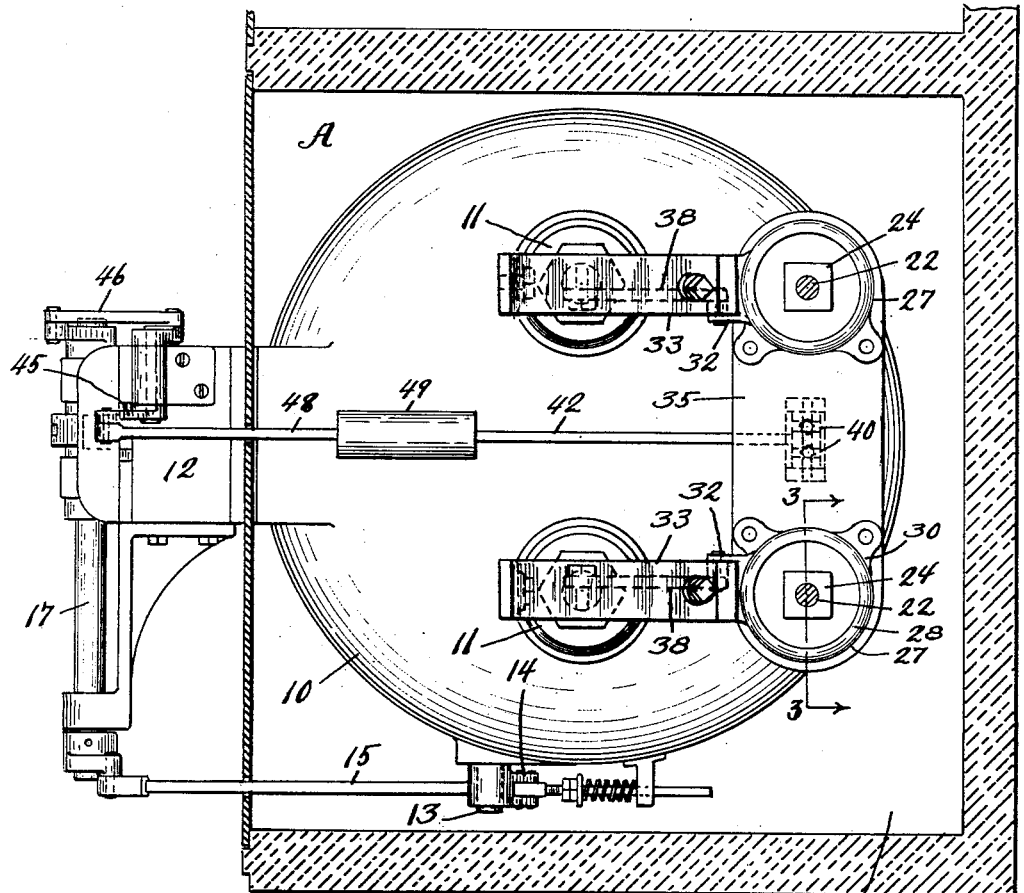
Fig. 2 is a plan section along lines 2—2 of Fig. 1.

The main switch may be of any suitable type and, as shown in Figs. 1 and 2, is an oil immersed electric switch 10 of the removable unit type, and is or may be removably received within the enclosing compartment or cell A. The switch may have the usual stationary switch members 11 extended thereabove and may have an electrically controlled operating device 12 carried by it and disposed without the cell, or the operating device may be otherwise disposed and arranged. The specific operating device here shown is disclosed in the following co-pending applications of Chester D. Ainsworth which are assigned to Sears B. Condit; application filed December 14, 1921, Serial No. 522,227, now Patent 1,574,531, February 23, 1926; and application filed February 9, 1922, Serial No. 535,220, now Patent 1,574,533, February 23, 1926; and application filed September 1, 1922, Serial No. 585,672, now Patent 1,627,821, May 10, 1927.

The switch 10 may have switch operating mechanism including the shaft 13 which has the arm 14 secured thereto. Said arm may be connected to the electrically operated device 12 by the link 15 and said link may be connected to the arm 16 fixed to the shaft 17 of said operating device. The operating shaft 17 of said operating device may be angularly rotated by means of the armature 18 which is secured to the link 19 and said link 19 may engage a face of an arm 20 fixed to the shaft 17.

The stationary members of the disconnecting switch are herein illustrated as carried by the top wall 21 of the cell A, although they may be otherwise disposed. Each stationary member of the disconnecting switch members may include the stud 22 secured in the insulator 23, which latter preferably extends both above and below said top wall 21. The upper end of said stud is or may be arranged for connection with a circuit lead in the usual manner, or the connection with a circuit lead may be arranged in any other suitable manner. The lower end of said stud preferably extends a substantial distance below the bottom of the insulator and terminates in a suitable contact terminal as the wedge portion 24 which has the opposed contact faces 24ª.

The movable switch member of the disconnecting switch may include the block 25 which carries and in which may be imbedded the two vertically spaced groups of laminæ forming brush contact members 26. Said brush members are adapted to engage the opposed contact faces of the wedge member 24 and make good electrical contact therewith, and connect a terminal of the oil switch removably with a circuit lead.

Figures 3, 4, 5:
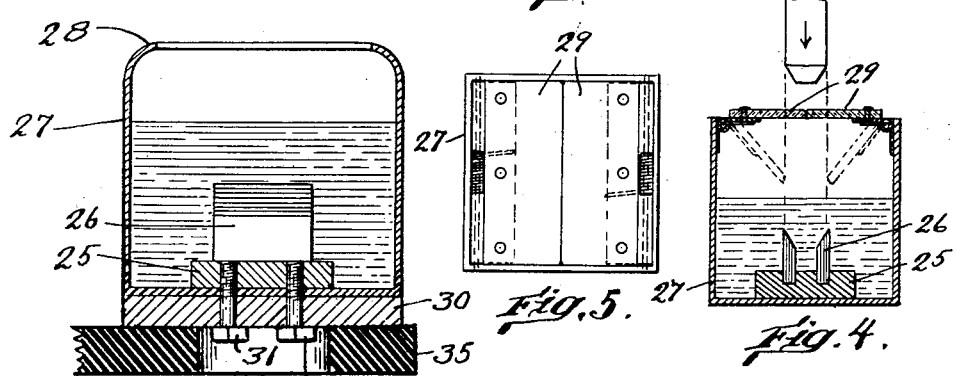
Fig. 3 is a sectional detail of a movable contact member of the disconnecting switch along line 3—3 of Fig. 2.
Fig. 4 is a sectional view of a modified form of oil pot, illustrating more particularly a cover for the pot.
Fig. 5 is a plan view of the oil pot of Fig. 4.

Said movable switch member is contained within and secured to the bottom wall of the oil pot 27 and may be electrically connected with said oil pot. Inasmuch as the disconnecting switch is not adapted to interrupt the circuit under load, said oil pot 27 may be made relatively small and contain merely sufficient oil or other suitable medium to cover the contact faces of the movable and stationary contact members, whereby to shield them from the oxidizing influence of the atmosphere. Said oil pot 27 may have the turned-in top edge 28 to reduce the possibility of spilling oil over the top when the pot is moved up and down to close or open the disconnecting switch; or the pot may be provided with the doors 29 made, preferably, of some insulating material, as fibre. As illustrated in Figs. 4 and 5, said doors are adapted to be opened automatically by engagement with the stationary member of the disconnecting switch in the switch-closing operation and closed automatically when the pot is moved downward to clear said stationary member. Said pot and the movable switch member disposed therein may be received on a suitable base 30 formed, preferably, of some conducting material and may be secured to said base by suitable means as the bolts 31. Said base 30 may have the arm 32 extended upwardly on one side of the oil pot and the upper portion of said arm may have the flexible conductor 33 connected therewith, and said conductor 33 may be connected with the stationary switch member 11 of the oil switch 10 whereby electrically to connect the movable contact member of the disconnecting switch with the corresponding switch member of the oil switch.

A board 35 of some insulating material, as wood, serves to separate and support in spaced and insulated relation the two oil pots 27 for the two poles of the disconnecting switch here shown and the bases 30 of said oil pots are or may be secured thereto by suitable means as the bolts 36.

The operating mechanism for the disconnecting switch may include means to move said oil pots with the movable contact members contained therein into and away from engagement with the stationary switch members 22 of the disconnecting switch and, preferably, to guide said oil pots and movable contact members for movement in approximately a straight line and support the oil pots in upright position during such movement. Said guiding means may include the pairs of parallel links 37 and 38 which are pivotally connected in a vertical plane to the arms 32 of the base member 30 and also to stationary switch members 11. Said operating mechanism may also include the vertically-operable toggle member comprising the pivotally connected links 40 and 41. Said link 40 is or may be pivotally connected to the board 35 preferably midway between the oil pots 27, and the link 41 may be pivotally connected to a suitable support as, and preferably, the casing of the oil switch 10. Said toggle member is adapted to be operated by the rod 42 to raise and lower the movable contact members of and consequently close and open the disconnecting switch. In the open position of the disconnecting switch, the position of the oil pots is preferably such that the tops thereof are suitably below the lower ends of the studs 22 of the disconnecting switch to permit the oil switch 10 to be withdrawn from the cell, and also to provide adequate air insulation between the pots, or the movable contact members, and the stationary contact members of the disconnecting switch.

The disconnecting switch is not adapted to interrupt the circuit under load and consequently, means are provided to open the disconnecting switch after the oil switch is opened and close the disconnecting switch before the oil switch is closed. The operating means for the disconnecting switch, by which this result may be obtained, may include the lever 45 pivoted to the electrically-controlled operating device 12 and connected to the shaft 17 thereof by suitable means as the lever 46. A link 48 is or may be connected with said lever 45 and is or may be slidably received in a cylinder 49 carried by the arm 42 of the disconnecting switch operating mechanism. A spring 50 is received within said cylinder to bear against one end thereof and against the enlarged end 51 of the rod 48. The arrangement is such that when the operating shaft 17 is angularly rotated in a counter clockwise direction, Fig. 1, to open the oil switch 10, the rod 48 is permitted to move within the cylinder without operating the disconnecting switch. During this movement, the oil switch is arranged to open sufficiently to quench the circuit-interrupting arc and interrupt the circuit. Upon further movement of the operating mechanism, said rod 48 is moved into engagement with the end of the cylinder 49 and consequently moves the rod 42 to collapse the toggle member comprising the links 40 and 41 and move the movable contact members of the disconnecting switch downward and open the disconnecting switch. When said operating shaft 17 is moved in the reverse direction to close the oil switch 10, the disconnecting switch is first closed, and a link 41 of the toggle may be moved against a stop 52 to prevent movement of the toggle beyond the closed position of the disconnecting switch. Said link 48, however, is free for further movement by compression of said spring 50 to permit further movement of the switch operating mechanism to close the oil switch.

Figure 6:
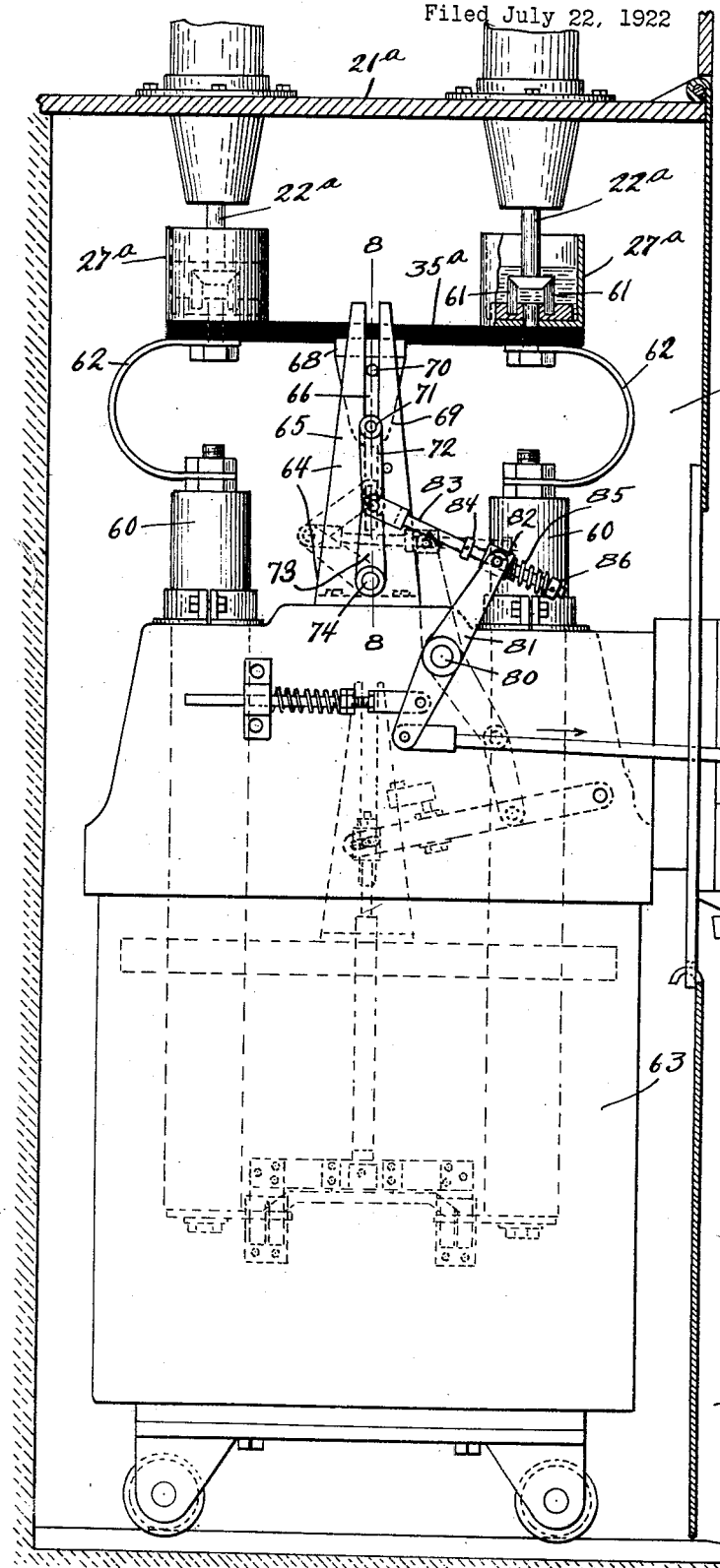
Fig. 6 is a side elevation partly in section of a modified form of switch apparatus embodying the invention.
Figure 7:
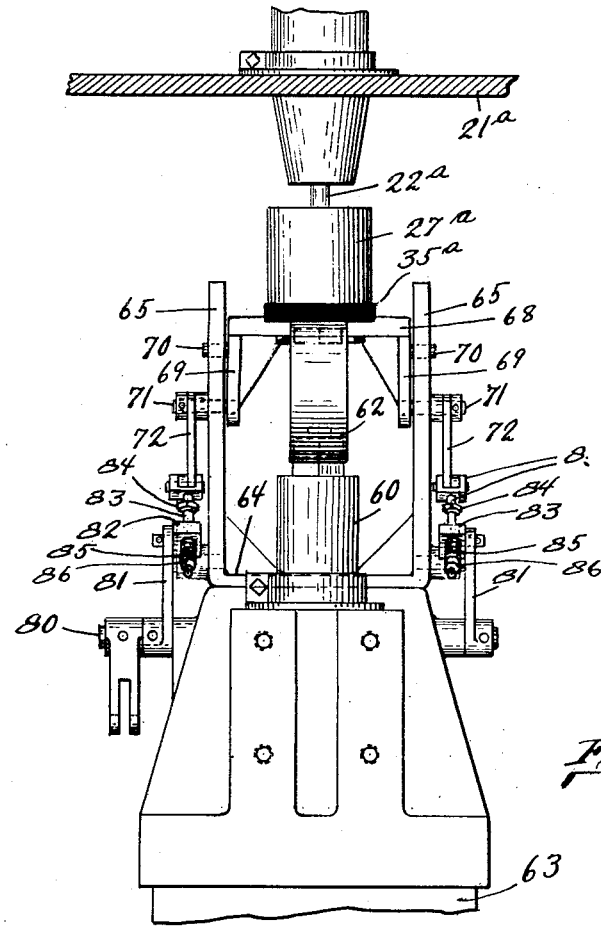
Fig. 7 is a front detail of the circuit-interrupting switch and disconnecting switch of Fig. 6 with the operating magnet removed.
Figure 8:
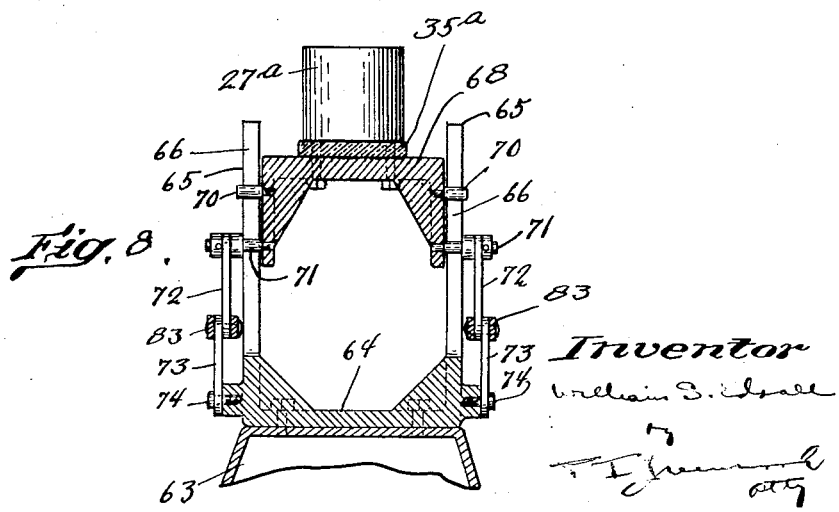
Fig. 8 is a vertical sectional detail along line 8—8 of Fig. 6.

In the oil switch illustrated in Fig. 1, the stationary switch members or terminals thereof are so arranged that a plane passing through them is parallel with the rear wall of the cell. In Fig. 6, a different form of switch is illustrated wherein the stationary switch members or terminals 60 are so arranged that a plane passing through them is perpendicular to the rear wall of the cell; and with this type of switch a modified form of disconnecting switch is illustrated.

As in Fig. 1, the stationary switch members 22ª of the disconnecting switch are illustrated as being carried by the top wall 21ª of the cell, although they may be otherwise disposed. A board 35ª of insulating material may serve to support and separate the oil pots 27ª which are adapted to contain the movable contact members 61. Flexible conductors 62 may serve to connect the stationary switch members 60 of the oil switch 63 with the movable contact members 61 of the disconnecting switch. The supporting member 35ª and the movable contacts 61 of the disconnecting switch are or may be guided for vertical movement in a straight line by means including a guide member 64. Said guide member is or may be secured to the top of the oil switch 63 between the stationary switch members 60 thereof and may have the two spaced arms 65 extended upwardly in a vertical plane transverse to said stationary switch members 60. Said arms 65 are formed with the aligned vertical slots 66 therein. A bracket 68 is or may be secured to the lower side of the insulating supporting member 35ª and may have the depending arms 69 which are disposed between the arms 65 of said guide member 64. Vertically spaced pins 70 and 71 are secured in said arms 69 in vertically spaced relation and extend into the vertical slots 66 of said guide member whereby to guide the supporting member 35ª for vertical movement and prevent angular rotation thereof. Said pins 71 may be extended outwardly beyond the arms 65 of the guiding member and the links 72 of toggle members may be pivotally connected therewith on opposite sides of said guide members. The other links 73 of said toggle members may be pivoted on the bolts 74 carried by the base portion of the guide member 64. It is obvious that the operation of said toggle members to straighten them serves to move the supporting member 35ª vertically upward to close the disconnecting switch while a movement of the links to break the toggle members serves to move the supporting member 35ª downward and open the disconnecting switch.

The disconnecting switch may be arranged for either manual or electrical operation independently of the oil switch or, and preferably, the operating mechanism for the disconnecting switch may be associated with the operating mechanism of the oil switch whereby the operation of the oil switch to open and close it will cause the opening and closing of the disconnecting switch in proper sequence. For this purpose, the operating shaft 80 of the oil switch may have the arm 81 fixed thereto and extended thereabove. Said arm may have a block 82 pivotally secured thereto in which a rod 83 is slidably received and said rod may be connected to the pivotal connection between the links 72 and 73 of the toggle members of the disconnecting switch. A collar 84 may be received on said rod 83 in front of said block 82 and a compression spring 85 may encircle said rod at the rear of said block 82 and bear against said rod and a collar 86 fixed on the end of said rod. Said arrangement is the equivalent of the structure illustrated in Fig. 1 to provide for the closing of the disconnecting switch previous to the closing of the oil switch and the opening of the disconnecting switch subsequent the opening of the oil switch, and operates in an obvious manner.

It will be noted that with the construction herein shown, the contact surfaces of the disconnecting switch are covered with oil or other suitable medium adapted to shield said contact surfaces from the atmosphere thereby to maintain them against oxidization; and a film of oil or other protective medium may remain upon the stationary contact members of the disconnecting switch in the open position of said disconnecting switch and when said contact members are exposed to the atmosphere.

It is obvious that the structure herein disclosed may be otherwise modified without departing from the spirit of the invention.

I claim:

1. An electric disconnecting switch comprising a stationary contact member, a movable oil receptacle having a contact member disposed beneath the oil therein, and means to move said oil receptacle upwardly to surround said stationary contact member and effect engagement of said contact members, and also move said receptacle downwardly to separate said contact members and withdraw said oil receptacle to a low position entirely below and clear of said stationary contact member.

2. An electric disconnecting switch comprising a stationary contact member, a movable oil receptacle having a contact member disposed beneath the oil therein, and means to move said oil receptacle upwardly to surround said stationary contact member and effect engagement of said contact members, and also move said receptacle downwardly to separate said contact members and withdraw said oil receptacle to a low position entirely clear of said stationary contact member and means to permit lateral movement of said oil receptacle in its low position.

3. An electric disconnecting switch comprising a stationary contact member, a movable oil receptacle having a contact member disposed beneath the oil in said receptacle, and means including guide links connected with said receptacle arranged to move it upwardly in upright position to surround said stationary switch member and effect engagement of said contact members, and also move said receptacle downwardly in upright position to separate said contact members and withdraw said oil receptacle to a position entirely below said stationary contact member.

4. An electric disconnecting switch having the combination of a stationary contact member, a movable oil receptacle having a brush contact member disposed below the oil in said receptacle, means to move said oil receptacle to effect engagement of said contact members, and also move said oil receptacle downwardly to a low position entirely clear of said stationary contact member.

5. An electric disconnecting switch having the combination of stationary contact members, a movable supporting member disposed below said stationary contact members, oil receptacles carried by said supporting member and insulated from each other, contact members contained within said receptacles and insulated from each other and having therebelow exposed terminals which are carried by and are movable with said supporting member and switch operating mechanism including means to move said supporting member into a position wherein said contact members are in engagement and also into a position wherein said contact members are disengaged and said receptacles are entirely below and clear of said stationary contact members.

6. An electric disconnecting switch having the combination of stationary contact members, a movable supporting member disposed below said stationary contact members, relatively insulated oil receptacles carried by said movable supporting member and having contact members contained therein, and means to move said movable supporting member upward to position said oil receptacles about said stationary contact members and effect engagement of said contact members, and also move said supporting member and oil receptacles downwards to a low position wherein said oil receptacles are disposed entirely below and clear of said stationary switch members.

7. An electric disconnecting switch having the combination of stationary contact members, a movable supporting member disposed below said stationary contact members, relatively insulated oil receptacles carried by said movable supporting member and means to move said movable supporting member upwards to position said oil receptacles about said stationary contact members and effect engagement of said contact members, and also move said supporting member and oil receptacle downwards to a low position wherein said oil receptacles are disposed entirely below and clear of said stationary switch members and means which admits of the lateral movement of said oil receptacles in the low position thereof.

8. An electric disconnecting switch having the combination of stationary contact members, a movable supporting member disposed below said stationary contact members, relatively insulated oil receptacles carried by said movable supporting member and having contact members contained therein and means including parallel links pivotally connected with said oil receptacles arranged to guide them for vertical movement in upright position.

9. An electric disconnecting switch comprising the combination of stationary switch members, a movable supporting member disposed below said stationary contact member, relatively insulated oil receptacles carried by said movable supporting member, guide links pivotally connected with the end portions of said supporting member whereby to guide it for vertical movement, and means to raise and lower said supporting member whereby to effect engagement and disengagement of said contact members.

10. An electric disconnecting switch comprising the combination of stationary switch members, a movable supporting member disposed below said stationary contact members, relatively insulated oil receptacles carried by said movable supporting member, guide links pivotally connected with the end-portions of said supporting member whereby to guide it for vertical movement, and means including a toggle connected with and disposed below said supporting member to raise and lower it whereby to effect engagement and disengagement of said contact members.

11. Electric switching apparatus comprising the combination of a main switch having switch terminals, a disconnecting switch carried by said main switch having a vertically movable oil receptacle and a contact member disposed within and carried by said oil receptacle, a fixed circuit terminal for said disconnecting switch disposed above said movable oil receptacle and contact member and having a support independent of said main switch, and means to move said oil receptacle upwardly about said fixed circuit terminal whereby to effect engagement of said terminal and contact member and also move said oil receptacle downwardly to a position below and entirely clear of said fixed circuit terminal.

12. Electric switching apparatus comprising the combination of a main switch having switch terminals, a disconnecting switch carried by said main switch having a vertically movable oil receptacle and a contact member disposed within and carried by said oil receptacle, a fixed circuit terminal for said disconnecting switch disposed above said movable oil receptacle and contact member and having a support independent of said main switch, and means to move said oil receptacle upwardly about said fixed circuit terminal whereby to effect engagement of said terminal and contact member and also move said oil receptacle downwardly to a lowermost position entirely clear of said fixed circuit terminal, said main switch arranged to be withdrawn laterally from operative relation with said fixed circuit terminal when said oil receptacle is in its aforesaid lowermost position.

13. Electric switching apparatus comprising the combination of a main switch having switch terminals, a disconnecting switch carried by said main switch having a vertically movable contact member connected electrically with and movable independently of a switch terminal, operating mechanism for said disconnecting switch arranged to move its contact member vertically, a fixed circuit terminal disposed above and arranged to cooperate with said movable contact member and means to open said main switch and then said disconnecting switch, and close said disconnecting switch and then said main switch, in the order named.

14. Electric switching apparatus comprising the combination of a main switch having a casing and switch terminals carried thereby, a disconnecting switch carried by said casing having a movable contact member, guiding means for guiding said movable contact member for vertical movement comprising parallel links pivotally connected with said movable contact member and a switch terminal of said main switch and a fixed circuit terminal disposed above and in cooperative relation with said movable contact member.

15. Electric switching apparatus comprising the combination of a main switch having a casing and switch terminals carried thereby, a disconnecting switch carried by said casing having a movable contact member, and an oil receptacle disposed about and movable with said movable contact member, guiding means to guide said movable switch member for vertical movement including parallel links pivotally connected with said movable contact member and oil receptacle and a switch terminal of said main switch, and a fixed circuit terminal disposed above and in cooperative relation with said movable member.

16. Electric switching apparatus comprising the combination of a main switch having a casing and switch terminals carried thereby, a disconnecting switch carried by said casing having a movable contact member, an oil receptacle disposed about and movable with said movable contact member, guiding means to guide said movable switch member for vertical movement including parallel links pivotally connected with said movable contact member and oil receptacle and a switch terminal of said main switch, a fixed circuit terminal disposed above and in cooperative relation with said movable contact member, and means to operate said main and disconnecting switches in successive order.

17. Electric switching apparatus comprising the combination of a main switch having a casing and switch terminals, a disconnecting switch carried by said casing having movable oil receptacles and contact members contained in said receptacles, means independently connecting each movable contact member electrically with a separate switch terminal of said main switch, fixed circuit terminals arranged for cooperation with said movable contact members, and means to move said oil receptacles and contact members into cooperative relation with said fixed circuit terminals.

In testimony whereof, I have signed my name to this specification.

WILLIAM S. EDSALL.